(12) United States Patent
Porta et al.

(10) Patent No.: US 8,255,131 B2
(45) Date of Patent: Aug. 28, 2012

(54) METHOD FOR MONITORING A GEAR-CHANGE OPERATION IN A MOTOR VEHICLE PROVIDED WITH A DUAL-CLUTCH TRANSMISSION

(75) Inventors: Attilio Porta, Orbassano (IT); Giancarlo Osella, Orbassano (IT); Gian Luigi Pregnolato, Orbassano (IT); Marco Montu', Orbassano (IT); Emanuel Corigliano, Orbassano (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 677 days.

(21) Appl. No.: 12/422,631

(22) Filed: Apr. 13, 2009

(65) Prior Publication Data
US 2009/0299584 A1 Dec. 3, 2009

(30) Foreign Application Priority Data
May 28, 2008 (EP) .................................. 08425383

(51) Int. Cl.
*G06F 7/00* (2006.01)
(52) U.S. Cl. ........................................... 701/55; 701/51
(58) Field of Classification Search .................... 701/51, 701/53–56
See application file for complete search history.

(56) References Cited

U.S. PATENT DOCUMENTS

| | | | | |
|---|---|---|---|---|
| 5,804,711 A | * | 9/1998 | Remboski et al. | 73/114.05 |
| 5,947,862 A | * | 9/1999 | Knapp et al. | 477/46 |
| 2008/0210181 A1 | * | 9/2008 | Nakamura | 123/90.16 |
| 2009/0183559 A1 | * | 7/2009 | Birk et al. | 73/114.27 |
| 2009/0216413 A1 | * | 8/2009 | Baldet et al. | 701/54 |

FOREIGN PATENT DOCUMENTS

| | | |
|---|---|---|
| EP | 0 857 895 A2 | 8/1998 |
| EP | 1 271 005 A2 | 1/2003 |
| EP | 1 887 261 A1 | 2/2008 |

* cited by examiner

*Primary Examiner* — Hussein A. El Chanti
(74) *Attorney, Agent, or Firm* — Sughrue Mion, PLLC

(57) ABSTRACT

The method monitors a gear-change operation in a motor vehicle provided with an engine whose crankshaft is connected to a transmission having a gearbox) comprising first and second primary shafts connectable to the crankshaft of the engine by respective friction clutches controlled by corresponding actuators, and a secondary or output shaft connectable to the primary shafts by gears defining a plurality of velocity ratios or gears. The method comprises the operation of verifying and validating the detection of the disengagement of the previously engaged gear by detecting the angular velocity of the primary shaft corresponding to the gear to be disengaged, and comparing the detected value of said angular velocity with at least one reference angular velocity.

5 Claims, 3 Drawing Sheets

METHOD FOR MONITORING A GEAR-CHANGE OPERATION IN A MOTOR VEHICLE PROVIDED WITH A DUAL-CLUTCH TRANSMISSION

The present invention relates to a method for monitoring a gear-change operation in a motor vehicle provided with an engine whose crankshaft is connected to a transmission having a gearbox comprising first and second primary shafts connectable to the crankshaft of the engine by respective friction clutches controlled by corresponding actuators, and a secondary or output shaft connectable to the primary shafts by gears defining a plurality of velocity ratios or gears.

The method according to the invention essentially comprises the operation of verifying and validating the detection of the disengagement of a previously engaged gear by detecting the angular velocity of the primary shaft corresponding to said gear to be disengaged, and comparing the detected value of said angular velocity with at least one reference angular velocity.

Other features and advantages of the invention will be found in the following detailed description, which is given purely by way of non-limiting example with reference to the appended drawings, in which.

Figure 1:
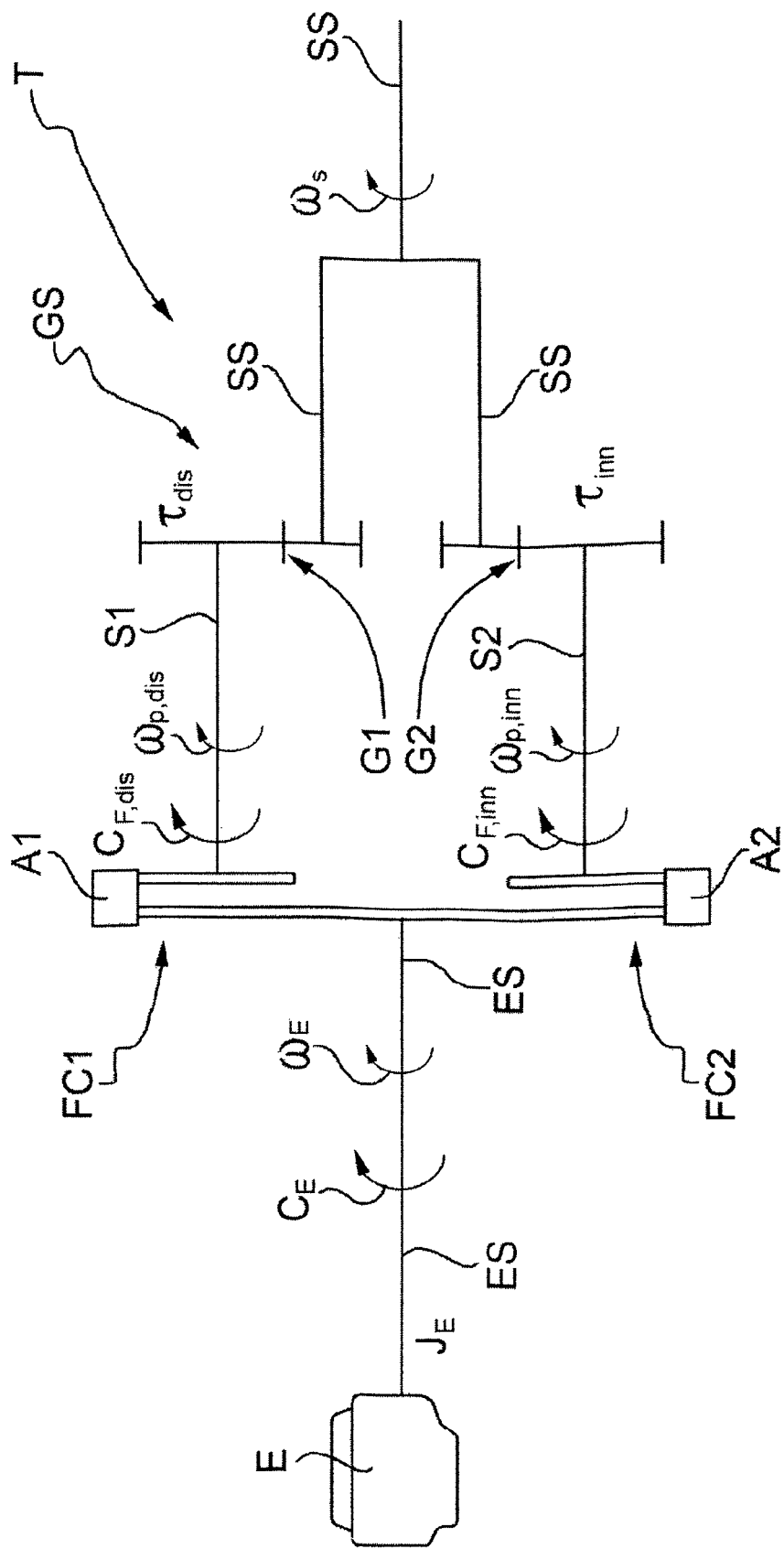
FIG. 1 is a simplified schematic view of a transmission with a dual-clutch gearbox.

In FIG. 1, E is the engine of a motor vehicle. The engine E has a crankshaft ES which, in operation, rotates at an angular velocity $\omega_E$ and develops a torque $C_E$.

The engine E is associated with a moment of inertia $J_E$.

The crankshaft ES of the engine E is connected to a transmission denoted by the general reference T.

The transmission T comprises a gearbox with first and second primary shafts S1 and S2, which are connectable to the crankshaft ES of the engine E by respective friction clutches FC1 and FC2 controlled by corresponding actuators A1 and A2, which may for example be electrically controlled actuators.

The gearbox GS also comprises a secondary or output shaft SS connectable to the primary shafts S1 and S2 by gears G1, G2 defining a plurality of velocity ratios or gears. In the simplified schematic view of FIG. 1 only two of these gears are shown.

In operation, the clutches A1 and A2 are each capable of transmitting respective torques to the associated primary shafts S1 and S2.

This invention provides a method for monitoring a gear-change operation. In view of the following description, with reference to FIG. 1 it will be assumed that the gear change to be monitored will be from a previously engaged gear, in the branch of the transmission containing primary shaft S1, to a new gear in the branch containing primary shaft S2.

In FIG. 1, $C_{F,dis}$ is the torque transmitted by friction clutch FC1 to that branch of the transmission T in which the change of gear requires disengaging the previously engaged gear. $C_{F,inn}$, on the other hand, is the torque transmitted by friction clutch FC2 to the branch of the transmission T of the new gear to be engaged.

$\omega_{p,dis}$ and $\omega_{p,inn}$ are the angular velocities of the two primary shafts S1 and S2, respectively.

$t_{dis}$ and $t_{inn}$ are the transmission ratios produced by gears G1 and G2, respectively, in the branches of the transmission T where the gear-change operation requires disengaging the previously engaged gear, and engaging the new gear, respectively.

$\omega_s$ is the angular velocity of the secondary shaft SS.

When monitoring a change of gear it is important to detect the disengagement of the previously engaged gear. This can easily be done by analysing the signals supplied by sensors measuring the positions of the gears of the synchronizers of the transmission T.

The detection of the disengagement of the previously engaged gear is, in the method of the invention, conveniently verified and validated in one of the various ways described below.

In general terms, the verification and validation of the detection of the disengagement of the previously engaged gear are based on detecting the angular velocity $\omega_{p,dis}$ of the primary shaft (S1 in the example shown in FIG. 1) corresponding to the gear to be disengaged, and comparing the detected value of this angular velocity with at least one reference angular velocity.

In a first embodiment, the angular velocity $\omega_{p,dis}$ of the primary shaft (S1) corresponding to the gear to be disengaged is compared with a reference velocity corresponding to the angular velocity $\omega_s$ of the secondary shaft SS multiplied by the transmission ratio $t_{dis}$ of this primary shaft S1 to the secondary shaft, corresponding to the gear to be disengaged. The disengagement of the gear is confirmed when the difference between the velocity $\omega_{p,dis}$ of the primary shaft and said reference velocity $\omega_s t_{dis}$ has an absolute value greater than a predetermined value.

Figure 2:
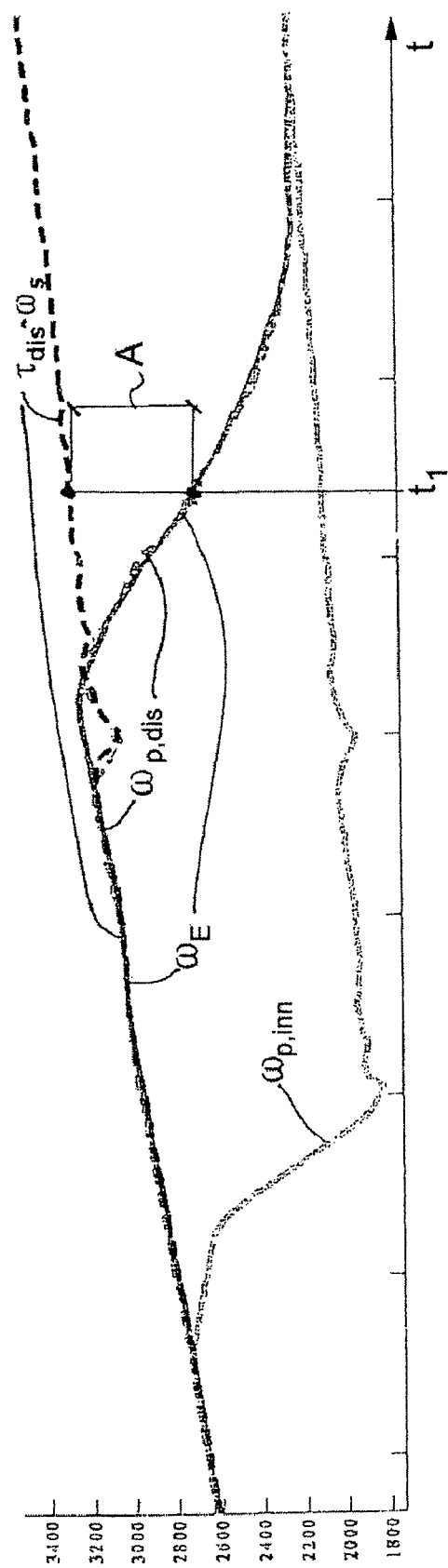
FIG. 2 is a series of curves showing examples, as a function of time t shown on the horizontal axis, of various values (angular velocities) during a gear change in the drive line depicted in FIG. 1.

Referring to the top curve in FIG. 2, such a condition is satisfied from and after the instant marked $t_1$ in that figure, in which the difference between $\omega_{p,dis}$ and $t_{dis}\omega_s$ becomes greater than a predetermined value A.

The velocity $\omega_{p,dis}$ can be measured by a known type of sensor such as a phonic wheel. Similarly, the velocity $\omega_s$ of the secondary shaft can also be detected by a sensor, or can be calculated from the measured angular velocities of the driving wheels, taking into account the transmission ratio at the axle.

The verification used in the first embodiment described above is advantageously done by suitably taking into consideration the value of the torque $C_{F,dis}$ transmitted by the clutch (FC1) connected to the velocity ratio or gear to be disengaged.

In a second embodiment, the angular velocity $\omega_{p,dis}$ of the primary shaft corresponding to the gear to be disengaged is compared with a reference velocity corresponding to the angular velocity $\omega_E$ of the crankshaft ES of the engine E. The disengagement of the previously engaged gear is confirmed when the velocity $\omega_{p,dis}$ is equal to this reference velocity, and the torque $C_{F,dis}$ transmitted by the clutch (FC1) connected to the gear to be disengaged is greater than a predetermined threshold value.

Figure 3:
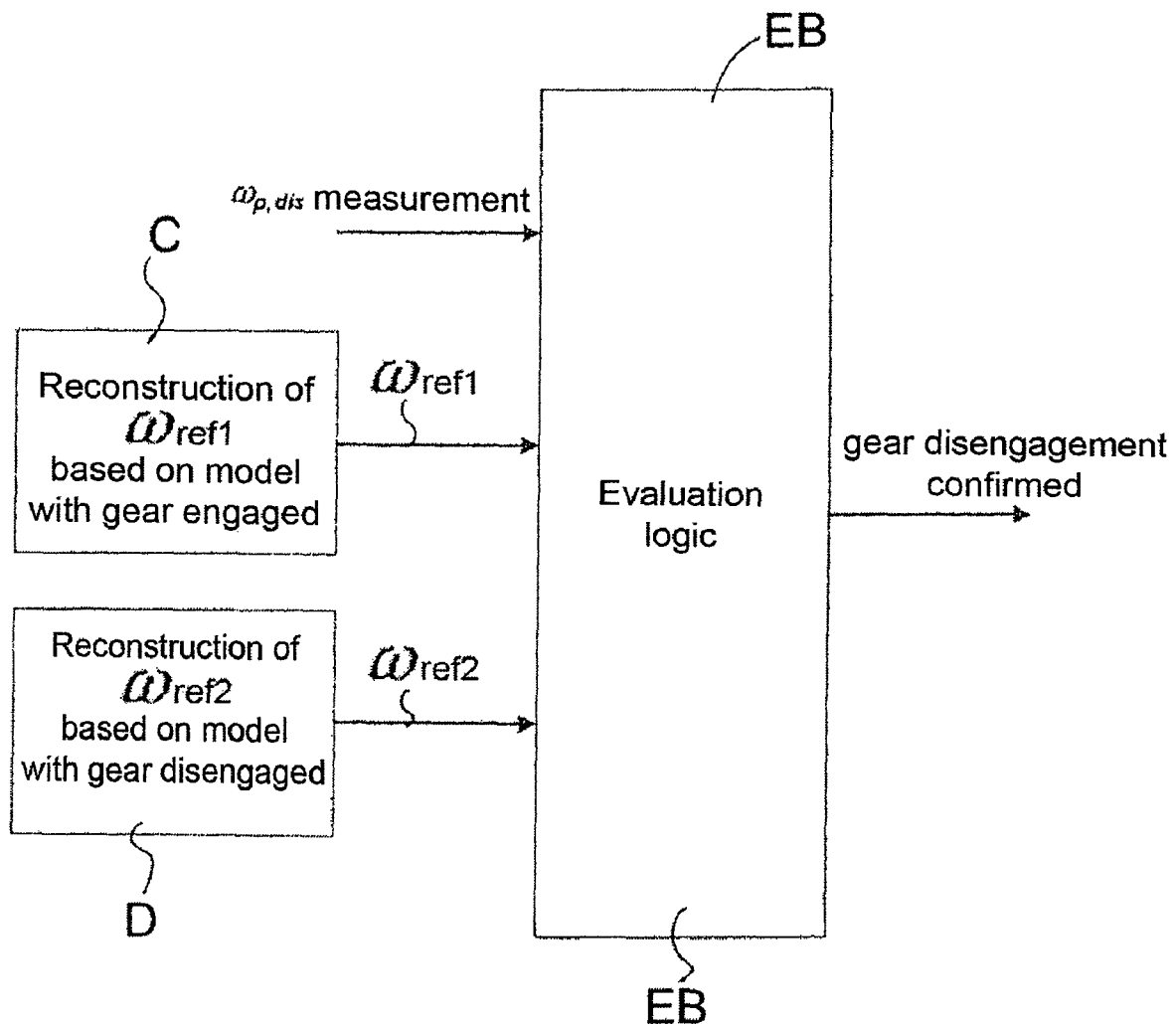
FIG. 3 is a schematic view of an embodiment of the method according to the present invention.

In another embodiment shown in the illustrative schematic, FIG. 3, the angular velocity $\omega_{p,dis}$ corresponding to the gear to be disengaged is compared with a first reference velocity and a second reference velocity, these being calculated by a first mathematical model and a second mathematical model, respectively, which describe the transmission T in the conditions in which said gear is engaged and disengaged, respectively. Referring to FIG. 3, determination of these reference velocities, written $\omega_{ref1}$ and $\omega_{ref2}$, takes place in two units which in this figure are labelled C and D, respectively.

As an example, the reference velocity $\omega_{ref1}$ may be equal to the product of the velocity $\omega_s$ of the secondary shaft SS and the transmission ratio $t_{dis}$ corresponding to the gear to be disengaged, while the reference velocity $\omega_{ref2}$ may be equal to the angular velocity $\omega_E$ of the crankshaft ES of the engine E.

The velocity $\omega_{p,dis}$ of the primary shaft corresponding to the gear to be disengaged is compared, in a logical evaluation unit EB, with the reference velocities $\omega_{ref1}$ and $\omega_{ref2}$. The disengagement of the previously engaged gear is confirmed when the angular velocity $\omega_{p,dis}$ satisfies a condition of predetermined congruency relative to the reference velocities $\omega_{ref1}$ and $\omega_{ref2}$.

The solutions described above for verifying and validating the disengagement of the "old" gear are based on the fact that the friction clutch connected to the gear to be disengaged is brought partially into contact, producing an advantageous action on completion of the gear-change operation. The reason for this is that the partial contact or partial closure of the friction clutch on the branch of the transmission T containing the gear to be disengaged, helps to synchronize, immediately after disengagement of the "old" gear, the angular velocity of the crankshaft of the engine E with that of the primary shaft of the gear to be disengaged, and thus obviates the need to perform this synchronization at the end of the operation.

Synchronizing the velocity $\omega_E$ of the crankshaft of the engine E with that of the primary shaft of the gear to be disengaged also facilitates operations in which two gear changes are required in succession. In such operations, if $\omega_E$ and the angular velocity of the primary shaft of the gear to be disengaged are not synchronized at the end of the first gear change, the second gear change request would have to be dealt with by making said primary shaft perform a greater velocity jump, which would increase the load on the associated synchronizer.

Naturally, without departing from the principle of the invention, the embodiments and details of construction may differ substantially from those described and illustrated purely by way of non-limiting example, without thereby departing from the scope of the invention as defined in the appended claims.

What is claimed is:

1. A method for monitoring a gear-change operation in a motor vehicle provided with an engine whose crank-shaft is connected to a transmission having a gearbox comprising first and second primary shafts connectable to the crankshaft of the engine by respective friction clutches controlled by corresponding actuators, and a secondary or output shaft connectable to the primary shafts by gears defining a plurality of velocity ratios or gears; the method comprising:

detecting a disengagement of a previously engaged gear;
verifying the detection by detecting an angular velocity of the primary shaft corresponding to the gear to be disengaged; and by comparing, by a controller, the detected value of said angular velocity with at least one reference angular velocity;
wherein the at least one reference angular velocity is calculated based on at least one of an angular velocity of the secondary shaft and an angular velocity of the crankshaft;
wherein the angular velocity of the primary shaft corresponding to the gear to be disengaged is compared with the reference velocity that corresponds to the angular velocity of the secondary shaft multiplied by a transmission ratio of said primary shaft to the secondary shaft, corresponding to the gear to be disengaged; wherein the disengagement of said gear is confirmed when the difference between the velocity of said primary shaft and said reference velocity has an absolute value greater than a predetermined value.

2. The method according to claim 1, wherein the angular velocity of the primary shaft corresponding to the gear to be disengaged is compared with a reference velocity corresponding to the angular velocity of the crankshaft of the engine; and wherein the disengagement of said gear is confirmed when the velocity of said primary shaft is equal to said reference velocity and the torque transmitted by the clutch connected to said primary shaft is greater than a predetermined threshold value.

3. The method according to claim 1, wherein the detecting the disengagement of the previously engaged gear is based on at least one sensor measuring positions of the gears.

4. The method according to claim 1, wherein the at least one reference angular velocity is obtained without values obtained from the other primary shaft.

5. A method for monitoring a gear-change operation in a motor vehicle provided with an engine whose crank-shaft is connected to a transmission having a gearbox comprising first and second primary shafts connectable to the crankshaft of the engine by respective friction clutches controlled by corresponding actuators, and a secondary or output shaft connectable to the primary shafts by gears defining a plurality of velocity ratios or gears; the method comprising:

detecting a disengagement of a previously engaged gear;
verifying the detection by detecting an angular velocity of the primary shaft corresponding to the gear to be disengaged and by comparing, by a controller, the detected value of said angular velocity with at least two reference angular velocities,
wherein the angular velocity of the primary shaft corresponding to the gear to be disengaged is compared with a first reference velocity and a second reference velocity,
wherein the first reference velocity and the second reference velocity are calculated by a first mathematical method and a second mathematical method, respectively, and
wherein the first reference velocity and the second reference velocity describe the transmission in the conditions in which said gear is engaged and disengaged, respectively; the disengagement of said gear being confirmed when the velocity of said primary shaft satisfies a condition of predetermined congruency relative to said first and second reference velocities.

* * * * *